United States Patent Office 3,062,622
Patented Nov. 6, 1962

3,062,622
PRODUCTION OF HYDROGEN PEROXIDE BY
ANTHRAQUINONE PROCESS
Leonard R. Darbee, Trenton, and Donald F. Kreuz,
Princeton Junction, N.J., and Theodore M. Jenney,
Kenmore, N.Y., assignors to FMC Corporation, a corporation of Delaware
No Drawing. Filed June 27, 1960, Ser. No. 38,702
3 Claims. (Cl. 23—207)

This invention relates to the production of hydrogen peroxide by the alternate reduction and oxidation of alkylated anthraquinones, and particularly to the employment of an improved catalyst and carrier therefor for use in the hydrogenating step of this process.

It is known that alkylated anthraquinones and their tetrahydro derivatives can be used as working compounds in a process for producing hydrogen peroxide. In this process, commonly known as the anthraquinone process, the working compound is dissolved in a suitable solvent or solvent mixture and is alternately reduced and oxidized to produce hydrogen peroxide. The hydrogenation is performed in the presence of certain desirable catalytic materials to facilitate the reduction of the quinone form of the working material. The hydrogen peroxide product which is derived from the oxidation step is generally removed from the working solution by extraction with water. The general operation of this process is fully described in United States Patent Nos. 2,158,525 and 2,215,883.

In carrying out the anthraquinone process, the hydrogenation of a mole of the quinone form of a working material theoretically produces 1 mole of the hydroquinone form of this working material. When this is oxidized, it theoretically yields 1 mole of hydrogen peroxide intermixed with the original mole of the working material in its quinone form. Upon separation of the mole of hydrogen peroxide by water extraction, the resultant working solution should contain theoretically the original mole of working material in its quinone form. However, side reactions, particularly during the hydrogenation step, considerably reduce this theoretical yield of hydrogen peroxide.

Therefore, in order to commercially carry out this process, the hydrogenation conditions and catalysts must be chosen so that the hydrogenation step is directed primarily toward the reduction of the quinone group to the hydroquinone substitutent; reduction of the nuclear ring to form anthraquinone degradation products, which do not cyclically oxidize and reduce to form hydrogen peroxide, must be minimized in order to maintain cyclic operation of the process with as much of the original working compound as possible.

The catalysts which have been employed most generally comprise the so-called Raney nickel and noble metals, i.e. platinum, rhodium, and palladium, particularly the latter. In the case of Raney nickel, the hydrogenation can be directed almost entirely to the reduction of the quinone group rather than to nuclear hydrogenation of the particular anthraquinone working compound, by employing amines and other compounds to control the hydrogenating action to the Raney nickel. The particular compounds used to control the hydrogenation action of the Raney nickel are taught in United States Patent Nos. 2,730,533, 2,720,532, 2,730,531, and 2,756,-243. However, Raney nickel catalysts are very readily poisoned by oxygen and hydrogen peroxide. Thus, the working solution must be subjected to extremely involved filtration and extraction procedures to remove traces of hydrogen peroxide or oxygen prior to being recycled to the hydrogenator. Further, nickel catalysts cannot be regenerated and accordingly must be replaced as soon as the activity falls off.

In an effort to overcome the serious disadvantages of Raney nickel, United States Patent No. 2,657,980 issued to Sprauer teaches that palladium deposited on an activated alumina carrier gives acceptable conversion of the quinone group to the hydroquinone substituent, without being sensitive to residual hydrogen peroxide or oxygen present in the working soution. Additionally, this palladium catalyst can be readily regenerated when its activity falls off. However, this catalyst has been found to produce undesirable side products which are incapable of producing hydrogen peroxide upon cyclic reduction and oxidation. Operation in fixed beds, where the catalyst is suspended on a fixed screen or support, appears to aggravate this condition.

It has been found, according to our parent U.S. application 694,111, filed November 4, 1957, now abandoned, and of which this case is a continuation-in-part, that palladium supported on an alkaline earth metal carbonate makes an excellent catalyst; this reaction is one in which hydrogenation takes place quickly, smoothly, and with a high preferential reduction of the quinone group with an unexpected minimum of nuclear hydrogenation.

However, one of the difficulties which has arisen in the use of these, and certain other carriers, has been in binding the noble metal catalyst to the carrier with sufficient adhesion to prevent the physical separation of the noble metal, i.e. palladium, from the carrier. This is a most serious problem since this separation destroys the catalytic activity of the catalyst, rendering it useless in the hydrogenator. This condition is particularly aggravated by the use of catalytic carriers which have a relatively low surface area, i.e. less than 5 square meters per gram, and a relatively low microporosity, i.e. less than 0.03 cc. per gram. The microporosity may be defined as the volume of porse of less than 800 A. diameter and can be measured by the method of Benesi, Bonnar, and Lee, Analytical Chemistry, vol. 27, p. 1963 (1955), "Determination of Pore Volume of Solid Catalysts." Such catalytic carriers are taught in our co-pending U.S. application 735,675, filed May 16, 1958.

Methods for overcoming this physical separation within the catalyst have been attempted but have not been proven successful, primarily because the methods employed in reducing the amount of physical separation also diminishes, or even eliminates, the desirable properties of the catalyst. For example, greater tenacity between the carrier and the noble metal may be accomplished by initially etching, or otherwise producing, irregularities on the surface of the catalytic carrier prior to adding the noble metal. The result of these treatments, however, is a corresponding reduction in the high, preferential hydrogenation of the quinone group in contrast to nuclear hydrogenation. As a result, the prior workers had to accept this catalyst-carrier separation as a natural incident in computing catalyst life and in determining the acceptability of a particular carrier.

It is an object of this invention to produce a noble metal catalyst which will preferentially hydrogenate quinones to hydroquinones with a minimum of nuclear hydrogenation, and which is not subject to separation of the noble metal component from the inert carrier, under normal handling and use.

It is a further object of this invention to produce a noble metal catalyst which will preferentially hydrogenate quinones to hydroquinones with a minimum of nuclear hydrogenation when employed in a fixed bed, and which is not subject to separation of the noble metal component from the inert carrier, under normal handling and use.

These and other objects will be apparent from the following description of the instant invention.

It has now been determined unexpectedly that an excellent catalyst for the hydrogenation step of the anthraquinone process may be prepared by employing a noble metal supported on dolomite. A tenacious bond is formed between the noble metal and the inert dolomite carrier which is not subject to breakage under normal handling and use. Further, this particular catalyst has been found to have more selective hydrogenation properties than other alkaline earth metal carbonate carriers which of themselves constitute a class of highly improved catalytic carriers, possessing selective hydrogenation advantages over the prior art.

This bonding is rather unexpected because none of the other alkaline earth metal carbonates possess this high degree of adhesive tenacity which dolomite exhibits toward noble metals. While the exact reason for this unusual tenacity is not known, it is believed that it may be due to a molecular attraction between the noble metal and the surface of dolomite's unique crystal structure. That is, the dolomite crystal contains both calcium and magnesium cations in combination with the carbonate, while other readily available alkaline earth metal carbonates, in contrast, are confined to but one metal cation. However, regardless of the understanding of this effect, dolomite still stands out as the only one of this class of alkaline earth metal carbonates which possess this property.

In order to produce this catalyst, dolomite, which is obtained as a naturally occurring rock, is ground to the desired fineness, as for instance about an average of 2 to 65 mesh, and preferably about 8 to 24 mesh, where the catalyst is employed in a fixed bed. When the catalyst is employed as a suspension in the flow stream, that is, a so-called fluidized catalyst, it is ground to rather extreme fineness.

After this simple preparation, the dolomite is impregnated with any of the noble metals, i.e. palladium, generally by treating the material with a soluble palladium salt, and thereafter reducing the palladium salt to metallic palladium in the known and conventional manner. The finely sized catalysts so prepared may be suspended in the working solution to be hydrogenated, or in large sizes may be supported on a fixed bed. The working solution, comprising the working material, and a solvent or mixture of solvents capable of carrying dissolved therein suitable alkylated anthraquinone or mixtures of anthraquinones, without precipitation, is hydrogenated in contact with this catalyst.

Mere contact of the catalyst, working solution and hydrogen gas, at suitable temperatures and pressures, i.e. temperatures in the neighborhood of room temperature, 20° C. to 50° C., and preferably 20° C. to 45° C., are employed during the hydrogenation step. When employing palladium upon a carrier of dolomite, the hydrogenation proceeds quickly, smoothly and with a high preferential reduction of the quinone group with a minimum of nuclear hydrogenation, particularly when the hydrogenation is carried out to somewhat less than the theoretical 100% reduction. A detailed description of a conventional hydrogenation technique can be found in the Bibliography of Scientific and Industrial Research by the United States Department of Commerce, Office of Technical Science, P.B. Reports 395 and 4336.

Particular advantage of the preferred catalyst of the present invention, that is, metallic palladium upon dolomite as a carrier, resides in the ability of this catalyst to resist separation of the metallic palladium from the dolomite carrier and to prevent the sloughing off of the palladium metal when the catalyst is subject to normal impact during handling and use. An ancillary advantage of this catalyst resides in its control of the depth of hydrogenation of the quinone group; that is, the quinone group can be reduced substantially to the hydroquinone group with a minimum of over-hydrogenation of the quinone group, thereby minimizing any resulting loss of working material and substantially eliminating the production of undesirable and unwanted by-products possessing no efficacy as a working material since their characteristic of undergoing additional cyclic oxidation and reduction has been lost.

The examples appended hereto are given as illustrative of the principles of the invention and are not to be deemed as limitative of it. These examples illustrate the superior adhesion of the palladium metal to the dolomite carrier; they further show that when this combination is used as a catalyst, hydrogenation proceeds substantially entirely in the normal and expected manner by reduction of quinone to hydroquinone with substantial absence of by-products not capable of further cyclic oxidation and reduction.

EXAMPLE 1

In Table I below there is indicated the change in usable moles of the working material (in this instance 2-ethyl anthraquinone) per 1000 moles of hydrogen peroxide produced when hydrogenated to conventional depth of 50% in a solution carrying 6% 2-ethyl anthraquinone and 6% 2-ethyl tetrahydroanthraquinone. The hydrogenation was performed at a temperature of 45° C. to 50° C. and at a hydrogen pressure in the range of 28 to 35 lbs./p.s.i. absolute. The catalyst was palladium and was placed on the specific carrier specified in Table I in amounts of from 0.2% to 0.5%, the carrier size being 8–20 mesh. The working mixture was a mixed solvent comprising trioctyl phosphate as the solvent for the hydroquinone form of the working material and dimethyl naphthalene as the solvent for the quinone form of the working material. Comparable results illustrating the favorable action of dolomite as a catalytic carrier are shown in Table I.

*Table I*

CHANGE IN MOLES OF USEABLE QUINONE FORM OF WORKING MATERIAL PER 1,000 MOLES OF HYDROGEN PEROXIDE PRODUCED

| Catalyst | Carrier | Total Loss in Moles, Reuseable Working Material |
| --- | --- | --- |
| Palladium, 0.5% | Dolomite | 0.03 |
| Palladium, 0.3% | Marble | 0.65 |
| Palladium, 0.5% | Calcium Aluminum Silicate | 3.90 |
| Palladium, 0.3% | Activated Alumina | 4.95 |
| Palladium, 0.5% | Activated Alumina | 5.50 |

EXAMPLE 2

A fixed catalyst bed 5 feet in diameter and 7 feet high was filled with 4,000 liters of a 10–20 mesh catalyst consisting of palladium on a dolomite base. An analysis of this heretofore unused catalyst revealed that the palladium was present in the amount of 0.26% by weight. Amounts varying between 60,000 to 75,000 liters per hour of a working solution were passed through this catalytic bed. Of this flow rate, from 10,000 to 20,000 liters per hour were passed in forward flow to the oxidizer and thence to a subsequent extraction system for recovery of the hydrogen peroxide, before being recycled to the catalytic hydrogenator. The remaining 50,000 to 60,000 liters per hour of working solution were directly recycled to the top of the catalytic bed. The work solution contained 6.3% 2-ethyl anthraquinone and 4.7% 2-tetrahydro ethyl anthraquinone dissolved in a solvent mixture containing dimethyl naphthalene as the quinone solvent and trioctyl phosphate as the hydroquinone solvent. Excess hydrogen at 25 p.s.i.g. was passed into the top of the catalytic chamber. The temperature of the bed was maintained at about 50° C. At the end of 2,513 hours, during which the catalyst was subjected to regeneration, the catalyst had a palladium content which remained unchanged, and its ability to hydrogenate the working compound into compounds which could produce hydrogen peroxide also remained constant.

EXAMPLE 3

In the same manner as Example 2, and employing substantially the same operating conditions and the same flow rate per area of catalytic bed, a catalyst consisting of palladium on an active alumina base was tested. An analysis of this heretofore unused catalyst revealed that palladium was present in the amount of 0.08 weight percent. At the end of 1,680 hours of operation, the catalyst had a palladium content of 0.04 weight percent, and its ability to hydrogenate the working compound into compounds which could produce hydrogen peroxide was reduced to 1/25 of its original value.

EXAMPLE 4

In the same manner as Example 2, and employing substantially the same operating conditions and the same flow rate per area of catalytic bed, a catalyst consisting of palladium on a marble carrier base was tested. An analysis of this heretofore unused catalyst revealed that palladium was present in the amount of 0.094 weight percent. At the end of 370 hours of operation, the catalyst had a palladium content of 0.064 weight percent, and its ability to hydrogenate the working compound into compounds which could produce hydrogen peroxide was reduced to about 1/5 of its original value.

EXAMPLE 5

In the same manner as Example 2, two catalytic carriers consisting of dolomite and containing as the noble metal, platinum and rhodium respectively, were tested. The results were substantially the same as those obtained when palladium was employed as the noble metal, with platinum being slightly superior to rhodium.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the method for the production of hydrogen peroxide by the cyclic reduction and oxidation of a liquid working solution containing an alkylated anthraquinone, wherein reduction is carried out in the presence of a hydrogenation catalyst made up of a particulate inert carrier having thereon a thin adherent deposit of a noble metal catalyst and wherein said hydrogenation catalyst is subject to separation of said noble metal catalyst from said inert carrier, the improvement which comprises empolying as a hydrogenation catalyst a particulate dolomite carrier having thereon a thin adherent deposit of a noble metal catalyst, said dolomite being an improved and adhering carrier for said noble metal catalyst.

2. The method of claim 1 wherein the noble metal catalyst is palladium.

3. The method of claim 1 wherein the catalyst is supported on a fixed bed.

References Cited in the file of this patent

UNITED STATES PATENTS

| | | |
|---|---|---|
| 1,222,660 | Paal | Apr. 17, 1917 |
| 2,930,803 | Holmes et al. | Mar. 29, 1960 |

FOREIGN PATENTS

| | | |
|---|---|---|
| 529,462 | Belgium | June 30, 1954 |
| 542,515 | Belgium | May 3, 1956 |

UNITED STATES PATENT OFFICE

CERTIFICATE OF CORRECTION

Patent No. 3,062,622                      November 6, 1962

Leonard R. Darbee et al.

It is hereby certified that error appears in the above numbered patent requiring correction and that the said Letters Patent should read as corrected below.

Column 1, line 63, for "to" read -- of --; column 2, line 9, for "soution" read -- solution --; line 38, for "porse" read -- pores --.

Signed and sealed this 18th day of June 1963.

(SEAL)
Attest:

ERNEST W. SWIDER
Attesting Officer

DAVID L. LADD
Commissioner of Patents